US009569963B1

(12) United States Patent
Williams et al.

(10) Patent No.: US 9,569,963 B1
(45) Date of Patent: Feb. 14, 2017

(54) SYSTEMS AND METHODS FOR INFORMING DRIVER OF TRAFFIC REGULATIONS

(71) Applicant: DENSO International America, Inc., Southfield, MI (US)

(72) Inventors: Matthew Williams, Royal Oak, MI (US); Takayuki Kimura, Farmington Hills, MI (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 14/958,208

(22) Filed: Dec. 3, 2015

(51) Int. Cl.
*G06K 9/00* (2006.01)
*G08G 1/0962* (2006.01)

(52) U.S. Cl.
CPC .................................. *G08G 1/09623* (2013.01)

(58) Field of Classification Search
CPC .................................................. G08G 1/09623
USPC ......................................... 340/905, 907, 475
See application file for complete search history.

(56) References Cited

U.S. PATENT DOCUMENTS 8,233,670 B2 * 7/2012 Moed et al. .................. 382/113
2002/0005778 A1 * 1/2002 Breed .................... B60Q 9/008 340/435
2009/0312888 A1 12/2009 Sickert et al.
2013/0154854 A1 * 6/2013 Chen ................ G08G 1/096741 340/905
2015/0145694 A1 * 5/2015 Dupont .................. G08G 1/167 340/903
2016/0176358 A1 * 6/2016 Raghu ................ G06K 9/00798 382/104
2016/0180707 A1 * 6/2016 Macneille ............ G08G 1/0962 701/117

FOREIGN PATENT DOCUMENTS

JP 4849061 B2 12/2011

* cited by examiner

*Primary Examiner* — Brent Swarthout
(74) *Attorney, Agent, or Firm* — Harness, Dickey & Pierce, P.L.C.

(57) ABSTRACT

Methods and systems for informing a driver of traffic regulations. A method includes detecting a traffic sign notifying the driver of a prohibited turn, alerting the driver of the prohibited turn if the driver activates a vehicle turn signal corresponding to the prohibited turn, and not alerting the driver of the prohibited turn if the driver does not activate the vehicle turn signal corresponding to the prohibited turn.

18 Claims, 2 Drawing Sheets

SYSTEMS AND METHODS FOR INFORMING DRIVER OF TRAFFIC REGULATIONS

FIELD

The present disclosure relates to systems and methods for informing drivers of traffic regulations, such as when a particular turn is not permitted.

BACKGROUND

This section provides background information related to the present disclosure, which is not necessarily prior art.

Systems currently exist for relaying traffic information from traffic signs to drivers. While existing systems are suitable for their intended use, they are subject to improvement. For example, it may be distracting to a driver to be informed of a "no turn on red" or "no turns" traffic sign each time such a sign is detected, particularly if the driver has no interest in making a turn. The present teachings provide improved systems and methods for informing drivers of traffic signs and regulations that address shortcomings in the art, and provide numerous advantages as one skilled in the art will recognize.

SUMMARY

This section provides a general summary of the disclosure, and is not a comprehensive disclosure of its full scope or all of its features.

The present teachings provide for methods and systems for informing a driver of a traffic regulation. For example, a method according to the present teachings includes the following: detecting a traffic sign notifying the driver of a prohibited turn; alerting the driver of the prohibited turn if the driver activates a vehicle turn signal corresponding to the prohibited turn; and not alerting the driver of the prohibited turn if the driver does not activate the vehicle turn signal corresponding to the prohibited turn.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Figure 1:
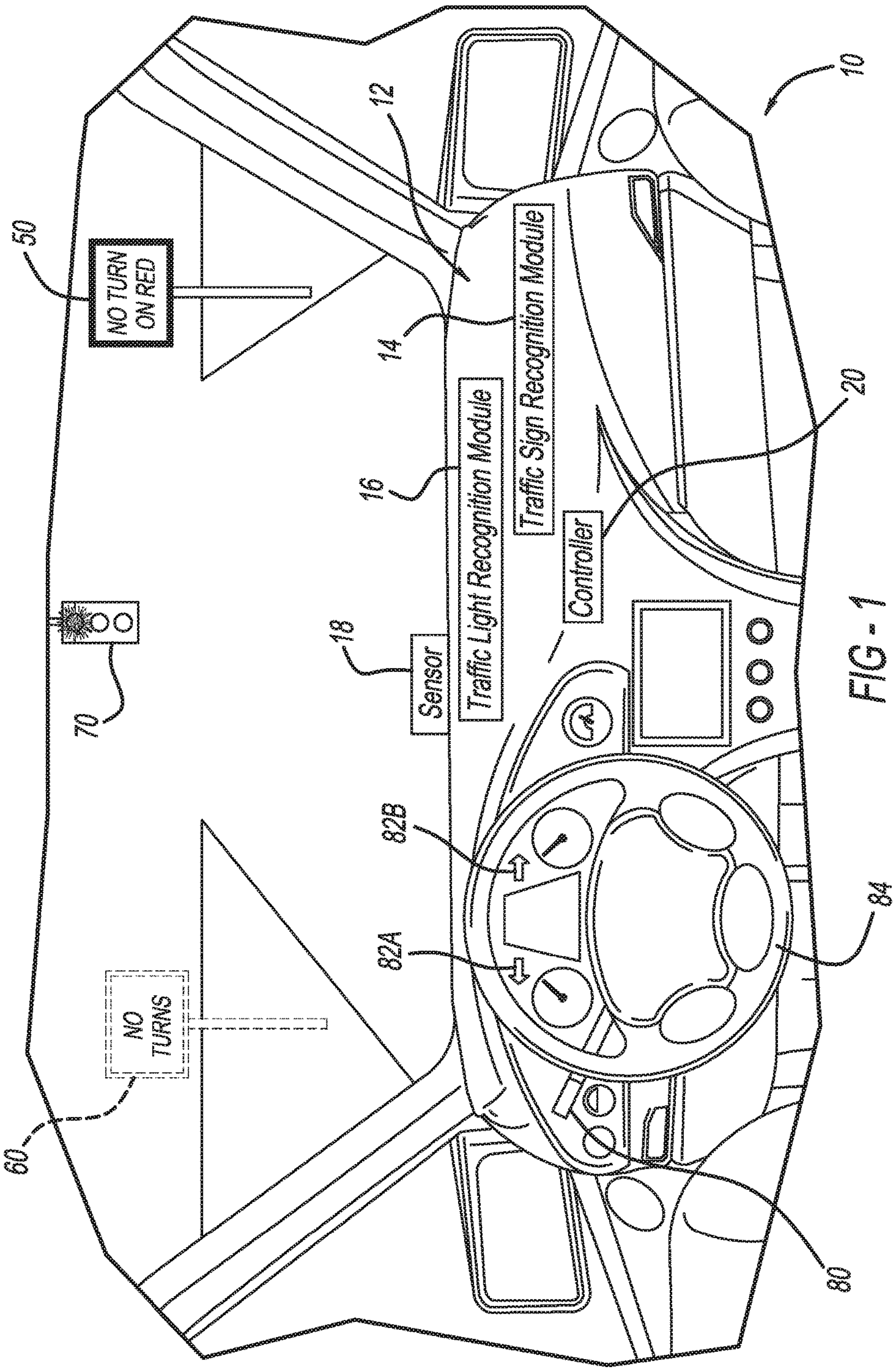
Figure 2:
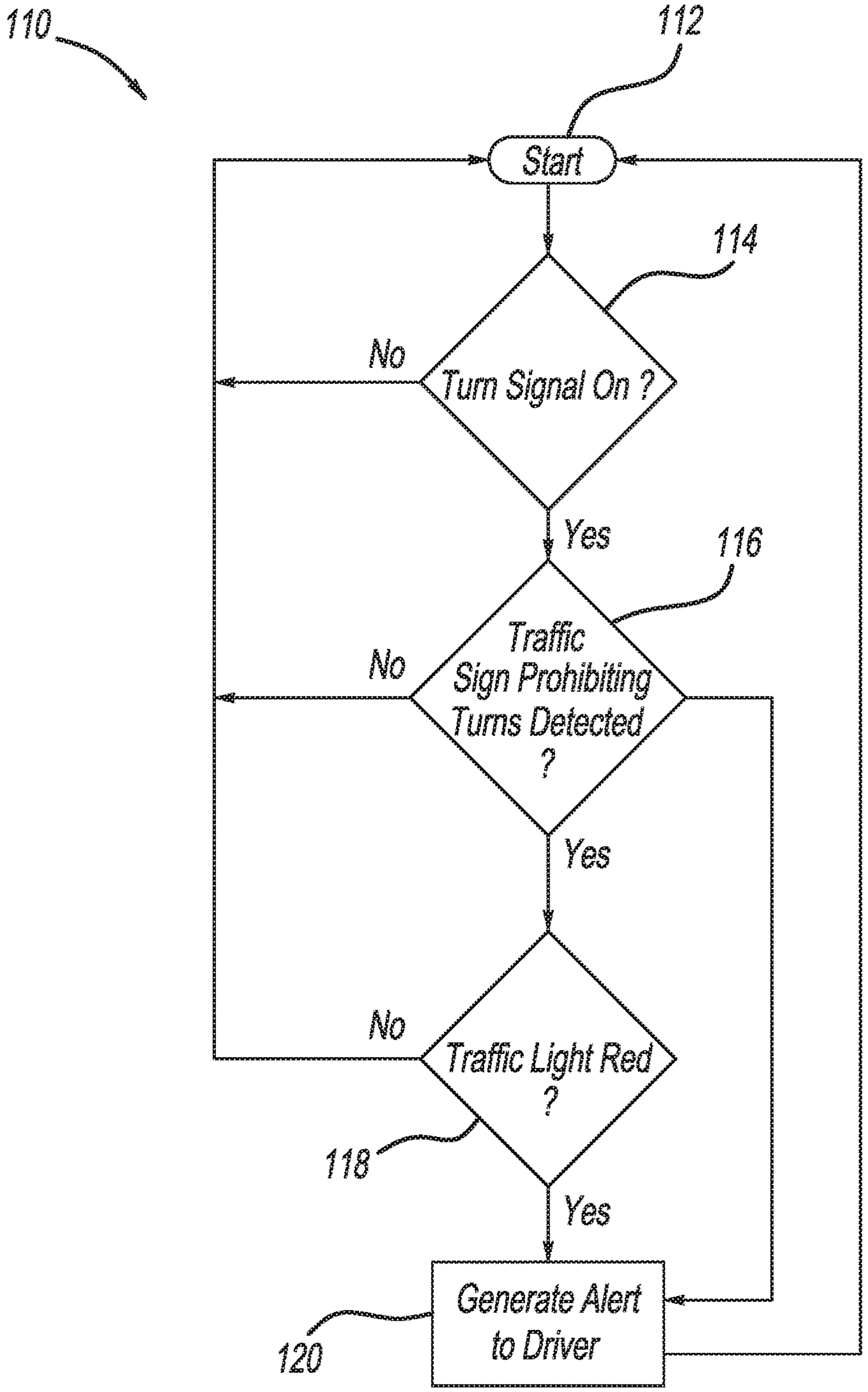

FIG. 1 illustrates a system according to the present teachings for informing a driver of a traffic regulation; and FIG. 2 illustrates a method according to the present teachings for informing a driver of a traffic regulation.

Corresponding reference numerals indicate corresponding parts throughout the several views of the drawings.

DETAILED DESCRIPTION

Example embodiments will now be described more fully with reference to the accompanying drawings.

With initial reference to FIG. 1, a vehicle 10 including a system 12 according to the present teachings for informing a driver of a traffic regulation is illustrated. The system 12 can be used with any suitable vehicle, such as an automobile, a mass transit vehicle, a military vehicle, aircraft, watercraft, truck, or train, for example. The system 12 generally includes a traffic sign recognition module 14, a traffic light recognition module 16, one or more sensors 18, and a controller 20. In this application, the terms "module" and "controller" may refer to, be part of, or include any suitable processor hardware (shared, dedicated, or group) that executes code, as well as memory hardware (shared, dedicated, or group) that stores code executed by the processor hardware. The code is configured to provide the features of the modules and controller(s) described herein. The controller 20 is any suitable controller configured to control the system 12, and is thus configured to control the traffic sign recognition module 14, the traffic light recognition module 16, and/or the sensor(s) 18.

The traffic sign recognition module 14 is configured to recognize traffic signs. The traffic sign recognition module 14 is configured to recognize any suitable traffic signs, such as traffic signs indicating that a particular type of turn is prohibited. As illustrated, for example, the traffic sign recognition module 14 is configured to detect traffic sign 50 indicating that "no turn on red" is permitted, as well as traffic sign 60 indicating that "no turns" are permitted (it is unlikely that both signs 50 and 60 will appear at the same intersection, so traffic sign 60 is illustrated in phantom in FIG. 1 indicating that traffic sign 60 is an alternate sign that may be posted at the illustrated intersection instead of sign 50). The traffic sign recognition module 14 is configured to recognize the traffic signs in any suitable manner. For example, the traffic sign recognition module 14 may receive inputs from sensor 18 including images of traffic signs. The traffic sign recognition module 14 is configured to analyze the traffic signs, such as images thereof, and identify the particular traffic regulation conveyed by the traffic signs. The traffic sign recognition module 14 is configured to use any suitable traffic sign recognition method and/or system to identify the traffic regulation displayed.

The traffic light recognition module 16 is configured to identify traffic lights or traffic signals, such as traffic light 70, and the status thereof. For example, the traffic light recognition module 16 is configured to determine whether the traffic light 70 is displaying a "stop" signal (which is usually red), a "go" signal (which is usually green), or a signal indicating that the traffic light 70 will soon turn red, thereby instructing the driver to stop (usually amber or yellow). The traffic light recognition module 16 is configured to detect traffic lights and the status thereof in any suitable manner using any suitable traffic light recognition method or system. For example, the traffic light recognition module 16 is configured to receive inputs from sensor 18, which may include images of traffic lights ahead. The traffic light recognition module 16 is configured to analyze the images using any suitable recognition technique to determine the status of the traffic lights ahead, such as whether traffic light 70 is red, green, or amber/yellow.

The sensor or sensors 18 can include any suitable sensor or sensors configured to detect traffic signs, such as traffic signs 50 and 60, as well as traffic lights, such as traffic light 70. The sensor(s) 18 are configured to detect the traffic signs and traffic lights in any suitable manner, such as by capturing images of the traffic signs and traffic lights, and/or signals identifying the traffic signs and/or traffic lights. The signals can be any suitable signals, such as optical signals not visible to the naked eye, or radio frequency signals. The signals can identify the traffic regulation displayed by the traffic signs, and/or the status of traffic light 70. The sensors 18 can include optical sensors, such as one or more cameras, and/or one or more antennas configured to receive radio frequency signals emitted at the traffic signs 50/60 and/or traffic light 70.

The "no turn on red" sign 50 refers to any traffic regulation prohibiting a turn when the traffic light 70 is red. For example, the "no turn on red" sign 50 may refer to a traffic regulation prohibiting right-hand turns when the traffic light 70 is red. Furthermore, the "no turn on red" traffic sign 50 may refer to a traffic regulation prohibiting a driver from turning left when the traffic light 70 is red. For example, the "no turn on red" traffic sign 50 may be posted at a divided highway turnaround that allows vehicles traveling in a first direction to turn around on the divided highway onto lanes of the divided highway that provide travel in a second direction opposite to the first direction. The "no turns" sign 60 refers to any traffic regulation prohibiting any turn, regardless of the status of the traffic light 70.

With continued reference to FIG. 1, and additional reference to FIG. 2, a method according to the present teachings for informing a driver of a traffic regulation is generally illustrated at reference numeral 110. From start block 112, the method 110 proceeds to block 114, where the controller 20 determines whether or not the driver has activated a turn signal of the vehicle 10, such as by actuating turn signal lever 80. If the controller 20 determines that the turn signal has not been activated, the method 110 returns to start block 112. If at block 114 the controller 20 determines that the turn signal has been activated, the method 110 proceeds to block 116.

At block, 116 the controller 20 determines whether the traffic sign recognition module 14 has identified a traffic sign prohibiting turns. If no traffic sign prohibiting turns has been identified, the method returns to start block 112. If a traffic sign prohibiting turns has been detected, and the traffic sign recognition module 14 determines that the traffic sign prohibits all turns regardless of the status of traffic light 70 (such as the "no turns" sign 60), the method 110 proceeds directly to block 120. At block 120, the controller 20 generates an alert to the driver to inform the driver that he or she is not authorized to turn.

Any suitable alert can be generated at block 120. For example, the instrument cluster turn signal indicator 82A or 82B, which typically illuminates green when the turn signal lever 80 is actuated, will change from green to red. Alternatively or in addition to illuminating the indicator 82A/82B red, any other suitable alert can be generated. For example, haptic feedback can be generated at the steering wheel 84, at a driver's side seat, or at any other suitable location. Furthermore, the alert may be an audible alert, or any suitable visual alert.

If at block 116 the traffic sign recognition module 14 detects a traffic sign that prohibits turns only when the traffic light 70 is red, the method 110 proceeds to block 118. At block 118, the traffic light recognition module 16 determines whether the traffic light 70 is red. If the traffic light is not red, the method 110 returns to start block 112. If the traffic light recognition module 16 detects that the traffic light 70 is red (or amber or yellow and thus about to turn red), the method 110 proceeds to block 120 where the controller 20 generates any suitable alert to the driver as described above.

The present teachings thus advantageously only alert the driver of the vehicle 10 of a traffic regulation restricting turns when the driver activates the vehicle turn signal to signal a turn in the direction prohibited, and only when the traffic light 70 is red when the traffic regulation prohibits a turn on red. If the driver is not planning on making a turn, and thus does not activate the turn signal, the present teachings will not disturb the driver with an alert notifying the driver of traffic regulations prohibiting turns.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for informing a driver of a traffic regulation comprising:
- detecting a sign notifying the driver of a prohibited turn;
- alerting the driver of the prohibited turn if the driver activates a vehicle turn signal corresponding to the prohibited turn;
- not alerting the driver of the prohibited turn if the driver does not activate the vehicle turn signal corresponding to the prohibited turn; and
- alerting the driver of the prohibited turn based on color of an instrument cluster turn signal indicator.

2. The method of claim 1, wherein the prohibited turn is turning right when a traffic light is red.

3. The method of claim 1, wherein the prohibited turn is turning left when a traffic light is red.

4. The method of claim 2, further comprising detecting a sign that reads "no turn on red".

5. The method of claim 1, wherein the prohibited turn is all turns regardless of whether a traffic light is red.

6. The method of claim 1, further comprising detecting a sign that reads "no turns".

7. The method of claim 1, wherein the prohibited turn is turning right when a traffic light signals for the driver to stop, the method further comprising:
- detecting status of the traffic light;
- alerting the driver of the prohibited turn if the driver activates the vehicle turn signal corresponding to a right turn and the traffic light signals for the driver to stop; and
- not alerting the driver of the prohibited turn if the driver activates the vehicle turn signal corresponding to the right turn and the traffic light does not signal for the driver to stop.

8. The method of claim 1, wherein the prohibited turn is turning left when a traffic light signals for the driver to stop, the method further comprising:
- detecting status of the traffic light;
- alerting the driver of the prohibited turn if the driver activates the vehicle turn signal corresponding to a left turn and the traffic light signals for the driver to stop; and
- not alerting the driver of the prohibited turn if the driver activates the vehicle turn signal corresponding to the left turn and the traffic light does not signal for the driver to stop.

9. The method of claim 1, further comprising alerting the driver of the prohibited turn by changing the color of the instrument cluster turn signal indicator from green to red.

10. The method of claim 1, further comprising alerting the driver of the prohibited turn with haptic feedback.

11. The method of claim 10, wherein the haptic feedback is steering wheel haptic feedback.

12. The method of claim 1, further comprising alerting the driver of the prohibited turn with audible feedback.

13. A system for informing a driver of a traffic regulation comprising:
- a traffic sign recognition module configured to detect signs notifying the driver of a prohibited turn;
- a traffic light recognition module configured to detect status of a traffic light;
- an alert notifying the driver of the prohibited turn when a vehicle turn signal is activated in a direction corresponding to the prohibited turn; and
- a controller configured to: detect activation of the vehicle turn signal;
- activate the alert when the vehicle turn signal is activated in the direction corresponding to the prohibited turn; and not activate the alert when the vehicle turn signal is not activated in the direction corresponding to the prohibited turn;
- wherein the alert includes an instrument cluster turn signal that changes color when the alert is activated.

14. The system of claim 13, wherein:
- the prohibited turn is turning right when the traffic light signals for the driver to stop;
- the controller is configured to activate the alert when the vehicle turn signal is activated to signal a right turn, and the traffic light signals for the driver to stop; and
- the controller is configured to not activate the alert when the vehicle turn signal is activated to signal a right turn, and the traffic light does not signal for the driver to stop.

15. The system of claim 13, wherein:
- the prohibited turn is turning left when the traffic light signals for the driver to stop;
- the controller is configured to activate the alert when the vehicle turn signal is activated to signal a left turn, and the traffic light signals for the driver to stop; and
- the controller is configured to not activate the alert when the vehicle turn signal is activated to signal a left turn, and the traffic light does not signal for the driver to stop.

16. The system of claim 13, wherein:
- the prohibited turn is turning left at any time;
- the controller is configured to activate the alert when the vehicle turn signal is activated to signal a left turn; and
- the controller is configured to not activate the alert when the vehicle turn signal is not activated to signal a left turn.

17. The system of claim 13, wherein the alert includes haptic feedback.

18. The system of claim 13, wherein the alert includes an audible alert.

* * * * *